(12) United States Patent
Banks et al.

(10) Patent No.: US 7,159,698 B2
(45) Date of Patent: Jan. 9, 2007

(54) DISC BRAKE ROTOR ASSEMBLY WITH REPLACEABLE WEAR SURFACES

(75) Inventors: Daniel E. Banks, Climax, MI (US); Alan Hendershot, Schoolcraft, MI (US); Thomas L. Runels, Battle Creek, MI (US); Ralph Larson, Olivet, MI (US)

(73) Assignee: Bendix Spicer Foundation Brake, LLC, Elyria, OH (US)

( * ) Notice: Subject to any disclaimer, the term of this patent is extended or adjusted under 35 U.S.C. 154(b) by 0 days.

(21) Appl. No.: 10/896,714

(22) Filed: Jul. 22, 2004

(65) Prior Publication Data

US 2006/0016646 A1  Jan. 26, 2006

(51) Int. Cl.
*F16D 65/12* (2006.01)

(52) U.S. Cl. .............. 188/218 XL; 188/73.1; 188/250 G; 188/265

(58) Field of Classification Search ............ 188/218 R, 188/218 XL, 234, 242, 243, 244, 265, 251 A, 188/250 G, 250 B, 73.1, 73.2, 79.51
See application file for complete search history.

(56) References Cited

U.S. PATENT DOCUMENTS

| | | |
|---|---|---|
| 2,485,085 A | 10/1949 | Burch |
| 2,541,979 A | 2/1951 | Amundsen |
| 2,767,817 A | 10/1956 | Davis |
| 3,698,519 A | 10/1972 | Crossman |
| 3,712,427 A * | 1/1973 | Cook et al. .............. 188/251 A |
| 3,724,612 A * | 4/1973 | Spain ................... 188/218 XL |
| 3,726,374 A | 4/1973 | Warren et al. |
| 3,746,139 A | 7/1973 | Bok et al. |
| 3,757,907 A | 9/1973 | Crossman et al. |
| 3,800,392 A * | 4/1974 | Cook et al. .............. 29/402.06 |
| 3,904,000 A | 9/1975 | Berger |
| 3,917,043 A | 11/1975 | Bok |
| 3,936,552 A * | 2/1976 | Krupp et al. .............. 428/66.2 |
| 4,018,311 A * | 4/1977 | Tickle ................... 188/218 XL |
| 4,076,106 A * | 2/1978 | Bermingham et al. .. 188/250 G |
| 4,276,969 A * | 7/1981 | Chin et al. ............ 188/218 XL |
| 4,350,231 A | 9/1982 | Crossman et al. |
| 4,613,021 A | 9/1986 | Lacombe et al. |
| 4,747,473 A | 5/1988 | Bok et al. |
| 4,763,762 A | 8/1988 | Schneider et al. |
| 5,439,077 A | 8/1995 | Wirth |
| 6,439,353 B1 | 8/2002 | Roloff et al. |
| 6,557,672 B1 | 5/2003 | Wirth |

FOREIGN PATENT DOCUMENTS

DE   198 42 981 A1   4/2000

* cited by examiner

*Primary Examiner*—Melody M. Burch
(74) *Attorney, Agent, or Firm*—Marshall & Melhorn, LLC

(57) ABSTRACT

A disc brake rotor assembly has a central carrier with a first side and a second side. At least two wear surfaces are releasably secured to the first side and at least two wear surfaces are releasably secured to the second side. A locking mechanism disposed within the central carrier selectively engages and releases the wear surfaces.

13 Claims, 10 Drawing Sheets

DISC BRAKE ROTOR ASSEMBLY WITH REPLACEABLE WEAR SURFACES

FIELD OF THE INVENTION

The present invention relates to disc brake rotor assemblies with replaceable wear surfaces for vehicle braking.

BACKGROUND OF THE INVENTION

Disc brake rotors having replaceable wear surfaces are well known to those skilled in the art. For example, U.S. Pat. No. 3,698,519 teaches a plurality of brake segments connected together to form a rotor braking surface. Each segment has at least two ears in each radially outward corner. A clip connects one ear from one segment to an ear of an adjacent segment. Two rivets are located in each clip to connect adjacent ears of adjacent segments together.

U.S. Pat. No. 3,726,374 provides for a rotor comprised of a plurality of concentric rings with a gap located between each ring. Adjacent facing members having overlapping ears are fixed to the rings with rivets. Friction lining materials are fixed to the facing members with rivets.

U.S. Pat. No. 3,757,907 teaches a central carbon base core and carbon based wear pads on both sides of the core. Key slot segments secure the wear pads to the core by locating rivets through holes in the slots and the core and pads.

U.S. Pat. No. 3,904,000 depicts and describes a brake disc comprised of a plurality of brake segments. The segments are joined together by clips on the outer periphery of the segments. Rivets are used to secure the clips to the segments.

U.S. Pat. No. 4,747,473 provides for a brake disc comprised of a plurality of segments each connected together at their outer periphery by a torque link. Each torque link has an eyelet on each of its ends. Each of the segments has a raised portion with an eyelet therethrough. The torque link spans the gap between adjacent segments and the eyelets on the torque link are aligned with the eyelets in the segments. A rivet is located through each eyelet to secure the segments together as a ring.

U.S. Pat. No. 5,439,077 teaches a brake ring divided into two segments. A pair of ring grooves are formed in the brake ring adjacent the gap between the two segments. A ring body is inserted into each ring groove to join the two segments. The ring segments are secured to the disk by screws or clamping sleeves.

Lastly, U.S. Pat. No. 6,557,672 provides for a friction ring divided into at least two ring segments. The ring segments are attached to the wheel disc by fastening devices, such as bolts. The ring segments are hinged together in an interlocking relationship.

The prior art also discloses locking mechanisms for the replaceable wear surfaces. For example, U.S. Pat. No. 2,541,979 describes and depicts a brake shoe with a plurality of clamping strips located on its outside surface. Flanges on the clamping strips act as guides for friction blocks. Each block has a pair of grooves for engaging and receiving the flanges on the clamping strips. A bolt is inserted through a hole in the brake shoe and into the clamping strips. The head of the bolt engages with the flanges on the clamping strip to spread them into gripping engagement with the friction blocks. The position of the bolts are secured with a nut bearing against the brake shoe.

U.S. Pat. No. 3,746,139 teaches a rigid disc member with opposing faces on which brake material segments are attached. The segments are located in spaced-apart positions about the circumference of the disc member. Grooves in the sides of adjacent segments each accommodate one half of a clamping member. The clamping member is then riveted to the disc member, thus securing the clamping member, and the segments under the clamping member, to the disc member.

U.S. Pat. No. 3,917,043 provides for a disc member having friction lining segments attached thereto. U-shaped brackets extend around the inner peripheral edges of the friction lining segments and the disc member. Rivets are used to secure the brackets to the disc member. Slots are located in the outer peripheral edge of the disc member. The slots extend radially into the body of the disc member. Sliding blocks are located in the slots. Edges of the segments have recesses for engagement with edges on the sliding blocks to hold the blocks in place. The blocks and brackets secure the segments in place. An alternative embodiment disclosed in the patent locates the U-shaped brackets on the outer peripheral edge and inserts the blocks through slots opening on the inner peripheral edge.

U.S. Pat. No. 4,350,231 discusses and discloses brake pads with mounting tangs formed of the same material as the pads. A core member is provided with slots to receive the tabs. A tubular clip is fitted over the ends of the tabs to draw the pads together and secure them in place on the core member.

U.S. Pat. No. 4,613,021 teaches a disc comprising a core consisting of six or eight radial arms spaced equally apart around a hub. The arms have a rectangular cross section and end in a double hook shaped flange. The hooks of the flange point toward the center of the hub creating a oblique bearing surface on either side of the core. Friction pads are attached to both sides of the disc. The pads are secured to the disc by being hooked and held both radially and axially by their outer edges. Spring-like rings, attached to the hub, are brought to bear against a tapered bearing surface of each pad.

U.S. Pat. No. 4,763,762 provides for a pad element attached to a disc element by a rivet. A T-shaped clip is arranged to overlap a side and upper edge surface of the pad element. The pad element has recesses along the side and upper edges to accommodate the thickness of the T-shaped clip. The T-shaped clip has spaced apart rivet openings to receive rivet-like heads. The riveted T-shaped clip and the rivet located in the pad element holds the pad element to the disc element.

U.S. Pat. No. 6,439,353 depicts and describes a support ring having a plurality of radially extending support arms. A brake segment is located in the gap between each support arm. The outwardly protruding free end of each one of the support arms is equipped with a locking member. A bolt, or screw, is located in each of the locking members to secure it in place. The support ring and arms may be constructed of a dissimilar material from the brake segment. A damaged, or worn out, brake segment may be removed and replaced with a new brake segment by loosening the bolt and rotating the locking members out of engagement with the segment.

The prior art described above is disadvantageous since most require the brake caliper, seals and/or bearings to be removed when the wear surfaces need to be replaced. Most of the prior art also requires the entire rotor to be removed from the hub to replace worn or damages wear surfaces. Additionally, most of the rotors described above require that the core, or wheel disc, that supports the wear surfaces must be the same material as the wear surface material. If exotic materials are used for both the wear surface and the wheel disc, the prior art designs greatly increase the cost of the product.

In light of the disadvantages of the prior art, it would be desirable to have a rotor assembly that allows for a variety of wear surface materials to be used with a low cost core. It would also be desirable to have a rotor assembly that did not require the assembly to be removed from the hub, that did not require the caliper to be removed, and that minimizes the need to disturb other wheel end components, such as bearing and seals, to change the wear surfaces. It would also be desirable to replace a single damaged, or worn, wear surface rather than having to replace all the wear surfaces when only one needs to be replaced.

SUMMARY OF THE INVENTION

The present invention is directed toward a disc brake rotor assembly for any braking application, and is particularly suited for vehicles. In accordance with the present invention, a disc brake rotor assembly is disclosed having a central carrier with a first side and a second side. At least two wear surfaces are located on the first side and at least two wear surfaces are located on the second side. At least one locking mechanism is disposed within the central carrier for selectively securing and releasing an inside surface of each of the at least two wear surfaces.

The present invention is also directed to a method of assembly of the disc brake rotor assembly that includes providing the central carrier with a first lip extending at least partially around the first side of the carrier and a second lip extending at least partially around the second side of the carrier and at least one locking mechanism window. A lip on the first wear surface is removeably secured to the first lip on the central carrier. A lip on the second wear surface is removeably secured to the second lip on the central carrier. An upstanding portion of the locking mechanism also selectively engages with at least one tab on one of the wear surfaces on the first side and at least one tab on one of the wear surfaces on the second side.

BRIEF DESCRIPTION OF THE DRAWINGS

The above, as well as other advantages of the present invention, will become readily apparent to those skilled in the art from the following detailed description when considered in the light of the accompanying drawings in which.

DETAILED DESCRIPTION OF THE PREFERRED EMBODIMENTS

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined in the appended claims. Hence, specific dimensions, directions or other physical characteristics relating to the embodiments disclosed are not to be considered as limiting, unless the claims expressly state otherwise.

Figure 1:
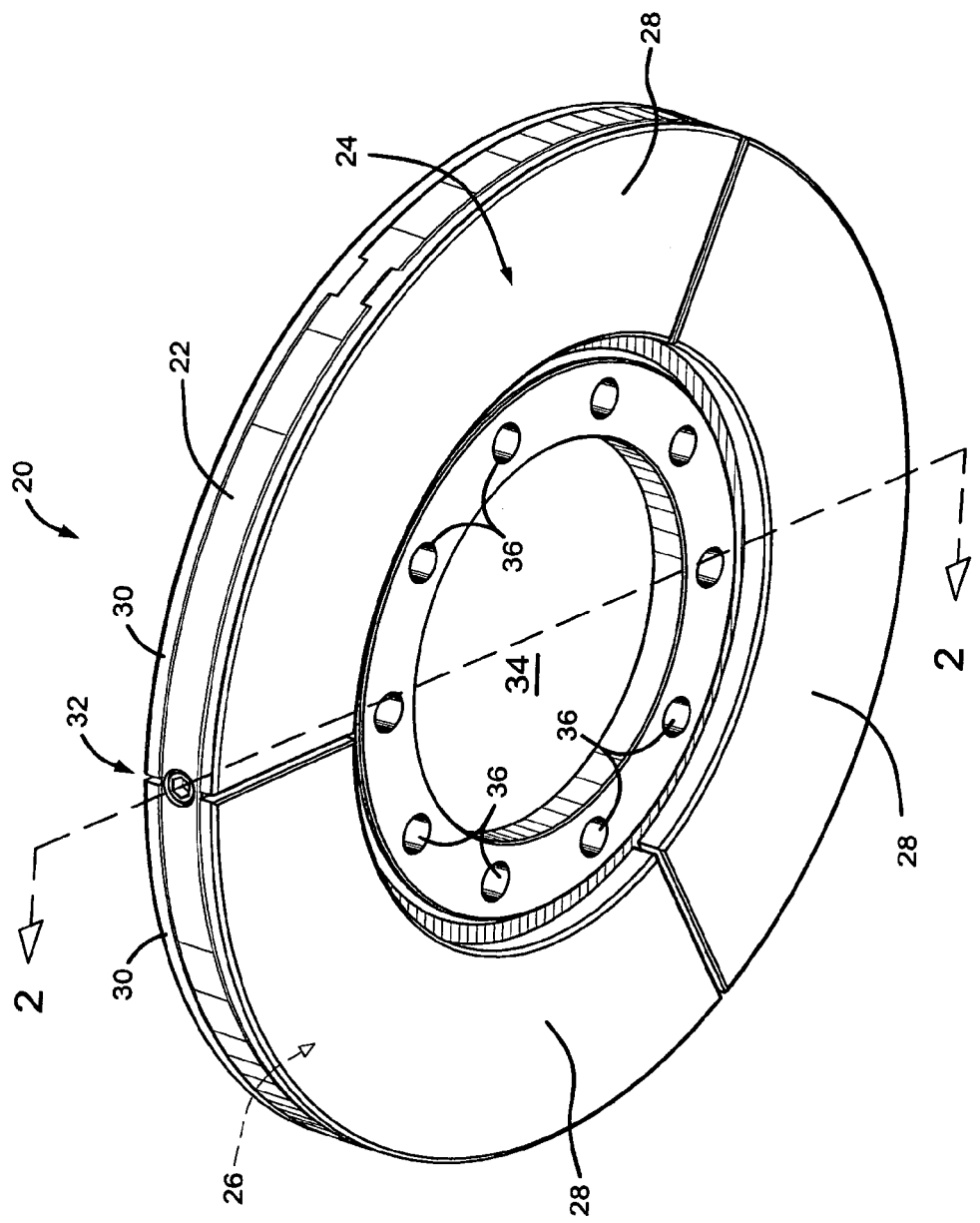
FIG. 1 is a perspective, schematic view of a preferred embodiment of the present invention.
Figure 2:
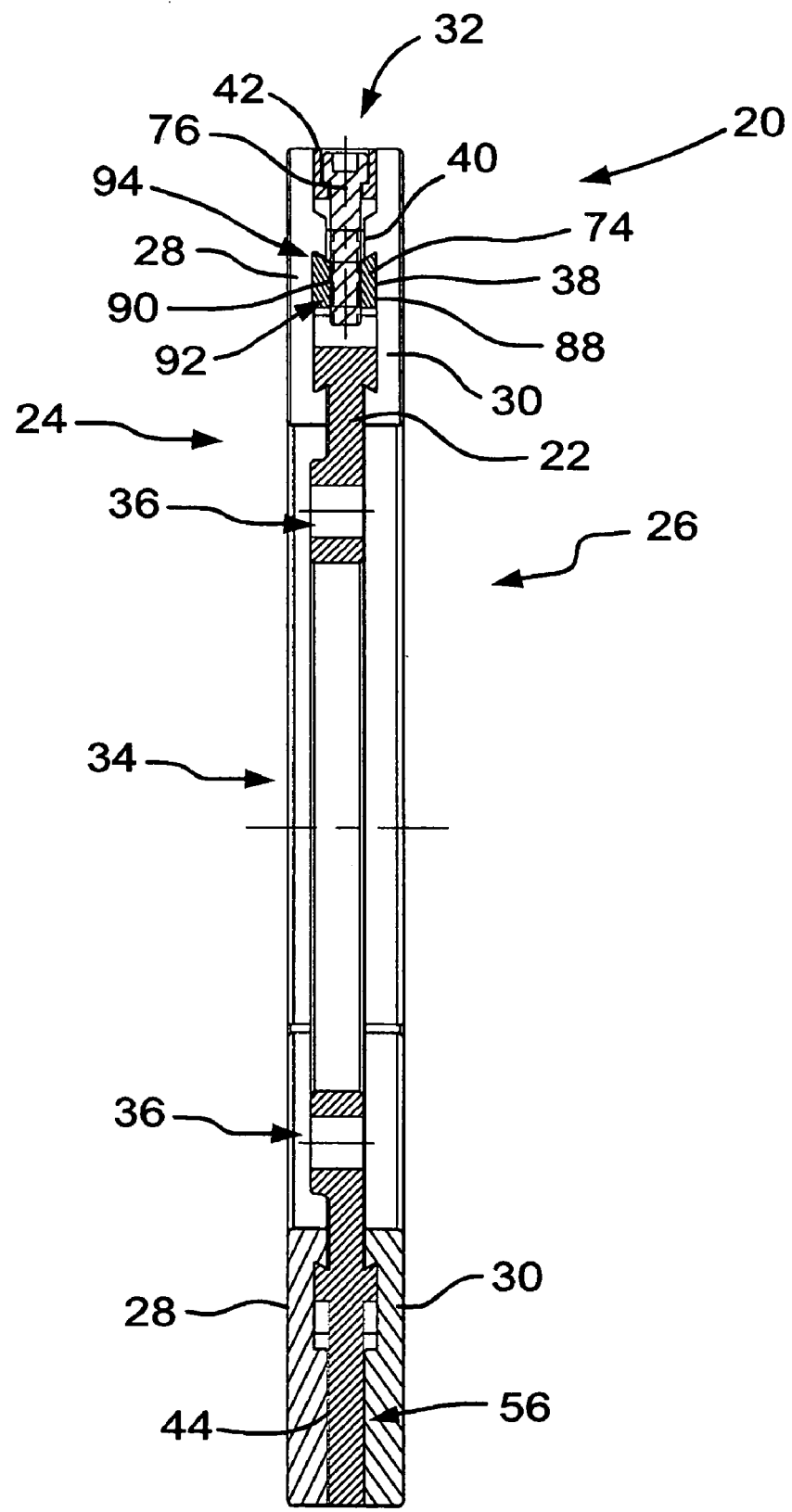
FIG. 2 is a sectional, side view of the present invention along line 2—2 from FIG. 1.

Referring to FIGS. 1 and 2, a preferred embodiment of a disc brake rotor assembly 20 is depicted. The figures and written description below are directed toward a wheel end vehicle brake assembly, however, the present invention may be used for braking other components of vehicles and components of non-vehicles alike. The assembly 20 has a central carrier 22 with a first side 24 and a second side 26. At least two wear surfaces 28 are located on the first side 24 and at least two wear surfaces 30 located on the second side 26, and a locking mechanism 32 is disposed within the central carrier 22.

The central carrier 22 can be constructed of iron or steel, or any low cost disc rotor material known to those skilled in the art. The wear surfaces 28, 30 can be constructed of other materials with thermal and wear properties that exceed the thermal and wear properties of the central carrier. By way of example only, the wear surfaces 28, 30 may be constructed of such materials as ceramics, aluminum composites, or metal matrix composites, as known to those skilled in the art.

Preferably, the central carrier 22 has a central aperture 34 for receiving a wheel end hub (not shown), as known to those skilled in the art. A plurality of bolt apertures 36 are provided in the carrier 22 for receiving a plurality of bolts (not shown) to secure the carrier 22 to the hub.

Figure 3:
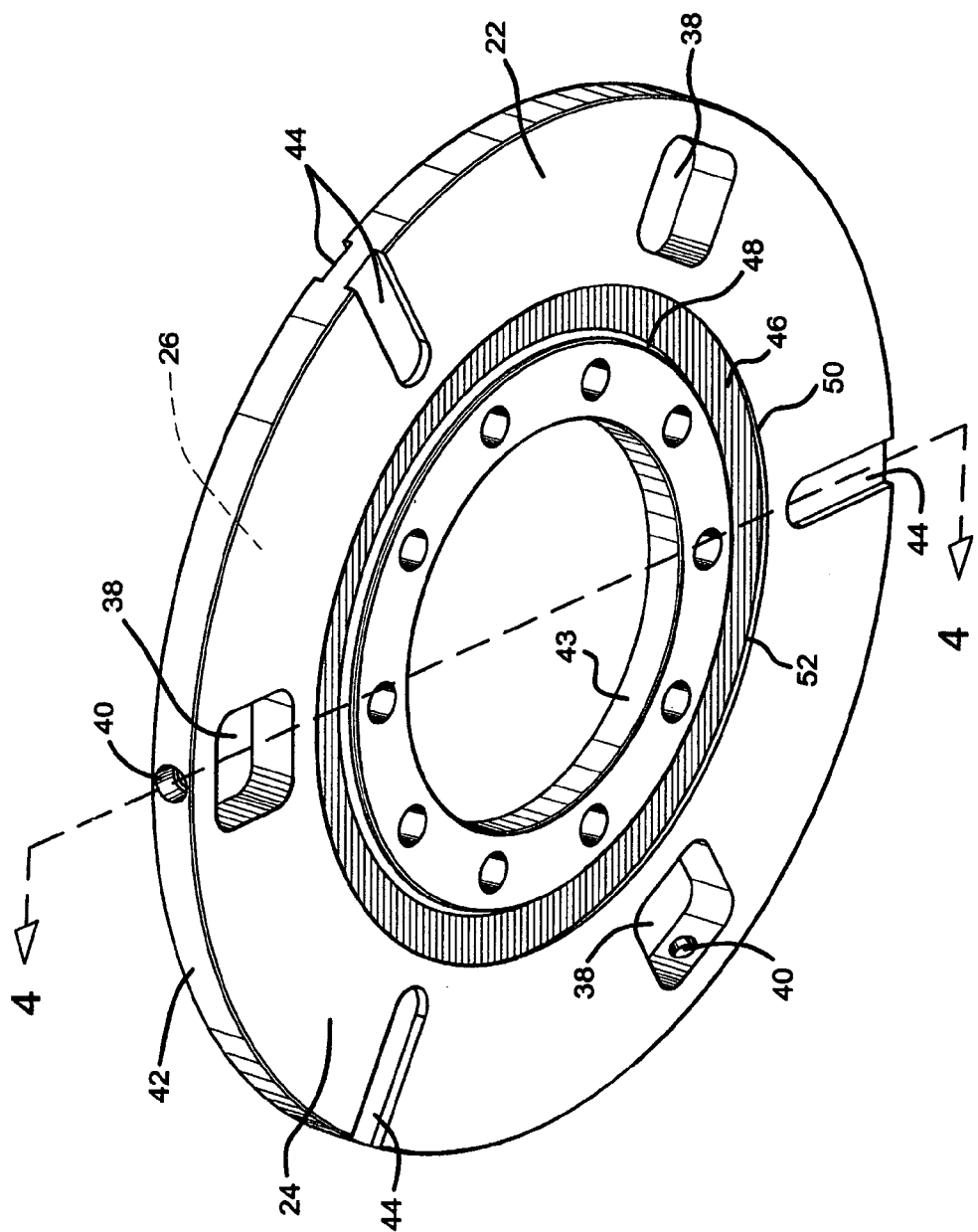
FIG. 3 is a perspective, schematic view of a component of the present invention.

As can be seen in FIG. 2, and probably best seen in FIG. 3, the central carrier 22 has a plurality of locking mechanism windows 38 disposed therein. Preferably, the windows 38 are located in the central carrier 22 equidistant from one another and each is located an equal radial distance from the center of the carrier 22. The windows 38 are depicted as square, however, windows 38 of any shape may be used without departing from the scope of the present invention. The windows 38 extend from the first side 24 of the carrier 22 through to the second side 26 of the carrier 22.

In the preferred embodiment, a locking member fastener channel 40 extends from an outer peripheral edge 42 of the central carrier 22 through the central carrier 22 to an individual window 38. A separate channel 40 extends from the outer peripheral edge 42 to each window 38 so that a plurality of channels 40 exist in the carrier 22. The channel 40 may also have a set of threads (not shown).

The central 22 also comprises an inner peripheral edge 43, as shown in FIG. 3. FIG. 3 also depicts preferred embodiment of the invention wherein the windows 38 are spaced from and confined by the inner peripheral edge 43 and the outer peripheral edge 42.

Referring now to just FIG. 3, a plurality of surface channels 44 are located on the first side 24 and the second side 26 of the carrier 22. In the preferred embodiment, the surface channels 44 on the first side 24 are spaced equidistant from one another and the surface channels 44 on the second side 26 are spaced equidistant from one another. Preferably, the surface channels 44 on the first side 24 are laterally aligned with the surface channels 44 on the second side 26. The surface channels 44 are depicted as an elongated U-shape and directed radially inward, however, those skilled in the art will appreciate that the surface channels 44 can be in any shape, depth, location or orientation.

Figure 4:
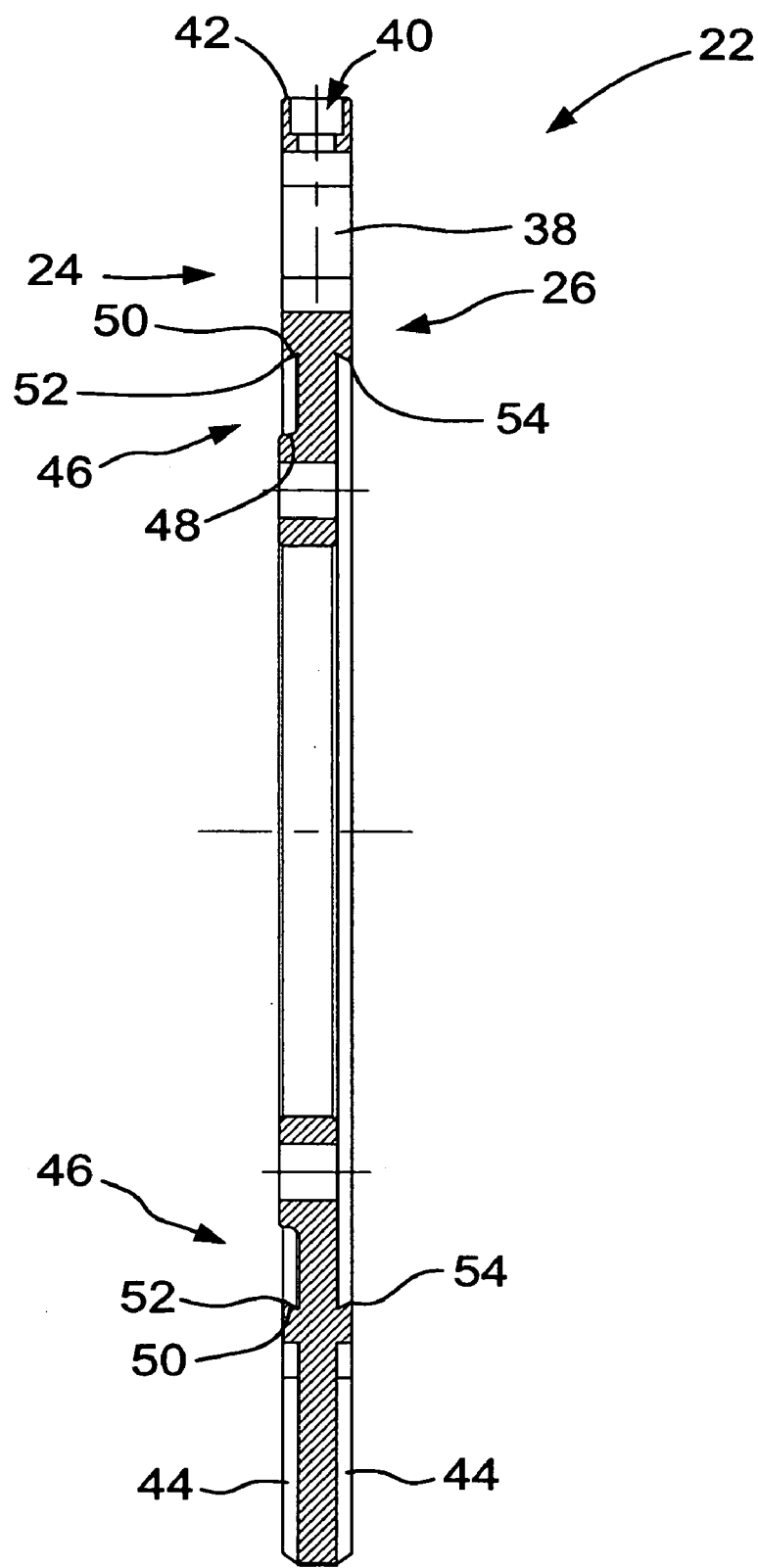
FIG. 4 is a sectional, side view taken along line 4—4 of FIG. 3.

As seen in FIGS. 3 and 4, a circumferential groove 46 is located on the first side 24 of the central carrier 22. The groove 46 is bounded by an inner wall 48 and an outer wall 50. In the preferred embodiment, the outer wall 50 has a first lip 52 that extends at least partially around the full circumference.

The second side 26 of the central carrier 22 has a circumferential second lip 54 formed therewith, as best seen in FIG. 4. Preferably, the second lip 54 extends completely around the second side 26.

Figure 5:
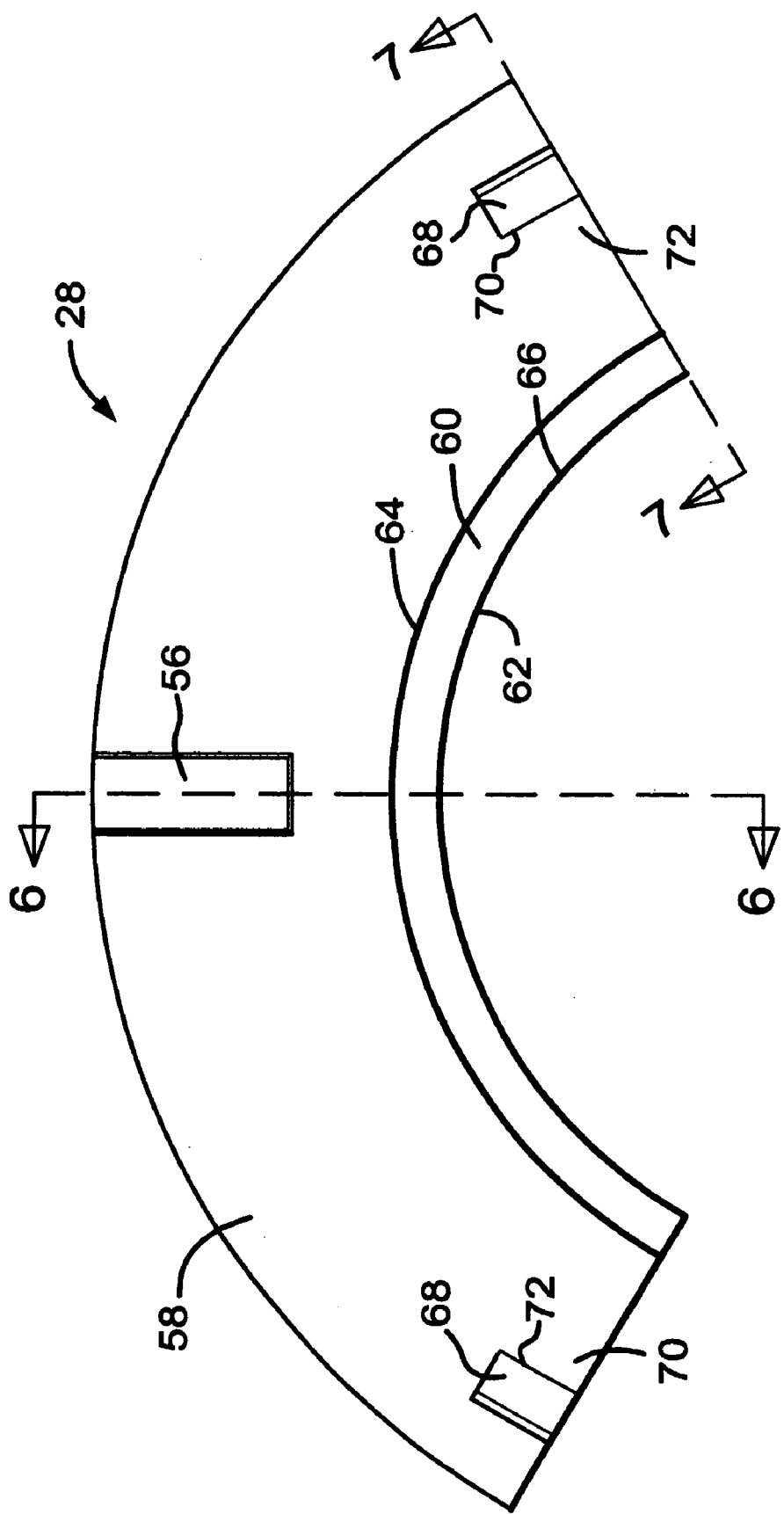
FIG. 5 is a front view of another component of the present invention.
Figure 6:
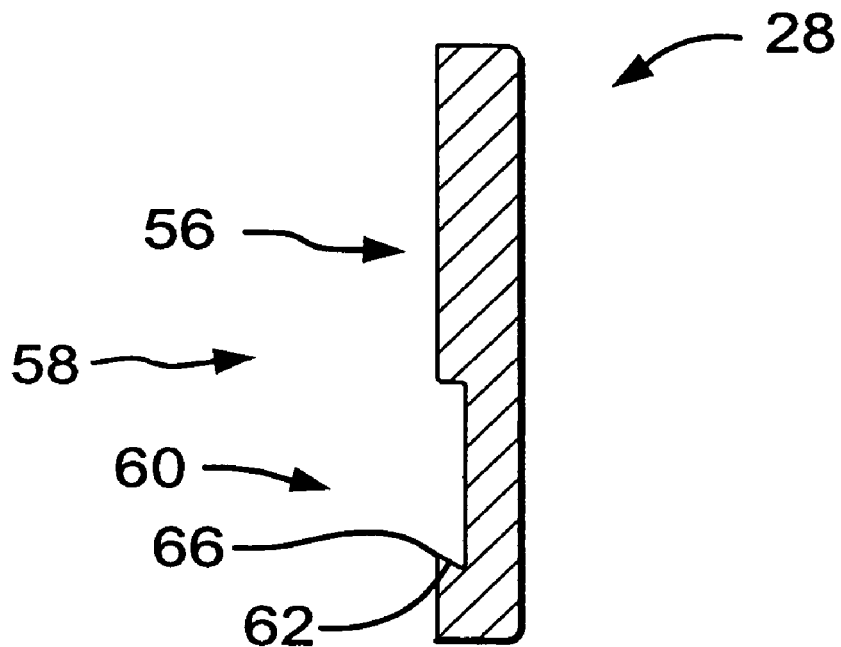
FIG. 6 is a sectional, side view taken along line 6—6 of FIG. 5.
Figure 7:
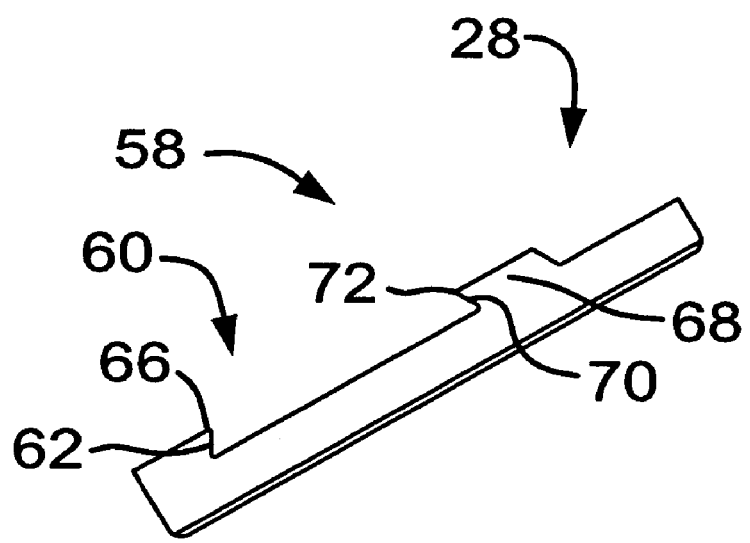
FIG. 7 is a sectional, side view taken along line 7—7 of FIG. 5.

Referring now to FIGS. 5, 6 and 7, one of the wear surfaces 28 or 30 (28 will be used in the figures and in the written description below to represent both wear surfaces in FIGS. 5, 6, and 7) for one of the sides 24 or 26 of the carrier 22 is depicted. The wear surface 28 preferably has an upstanding fitting 56 on an inside surface 58 thereof, as best seen in FIGS. 5 and 6. Each upstanding fitting 56 has a complementary shape, design, location and orientation to one of the surface channels 44 on the carrier. Although only one embodiment of an upstanding fitting 56 is depicted for the present invention, those skilled in the art will appreciate that each upstanding fitting 56 may have its own unique shape, design, location and orientation to fit within a specific surface channel 44 on the carrier 22.

FIGS. 5, 6 and 7 also depict an arced groove 60 in the inside surface 58 of the wear surface 28. The groove 60 is bounded by an inner wall 62 and an outer wall 64. The inner wall 62 has a lip 66 that preferably extends along the entire length of the groove 60.

At least two upstanding tabs 68, located on opposite sides of the inside surface 58 of the wear surface 28, 30 are best seen in FIGS. 5 and 7. An inside edge 70 of each tab 68 is provided with a lip 72, as depicted in FIG. 7.

Figure 8:
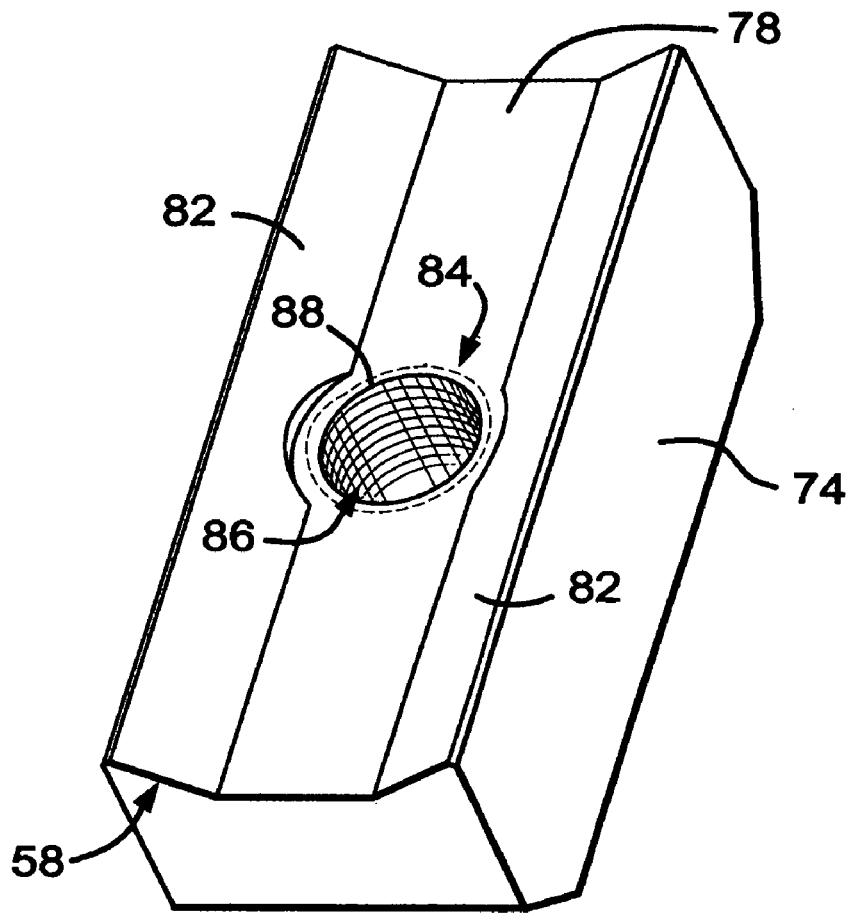
FIG. 8 is a perspective, schematic view of a component of the present invention.
Figure 9:
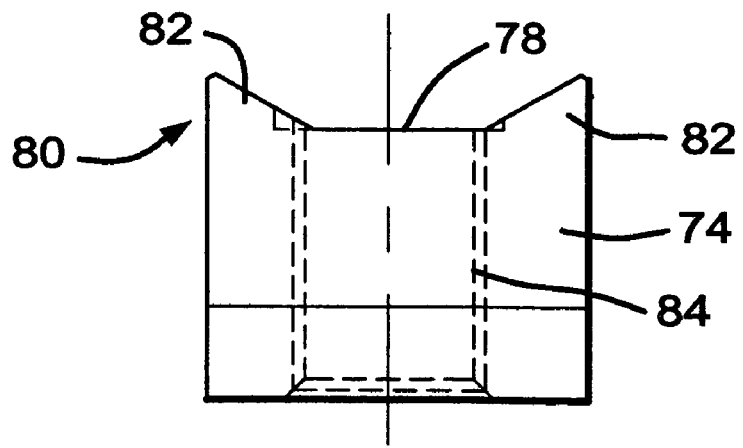
FIG. 9 is a side view of the component depicted in FIG. 8.

In the preferred embodiment, the locking mechanism 32 comprises a block 74 and a fastener 76 (see FIG. 2). As shown in FIGS. 8 and 9, the block 74 is provided with a channel 78 along an upper portion 80. The channel 78 is bounded by at least two upstanding portions 82 that extend along the length of either side of the channel 78. Each block 74 is designed to slidably fit within one of the locking mechanism windows 38.

An aperture 84 is preferably located through the block 74, as depicted in FIGS. 8 and 9. In the preferred embodiment, the interior surface 86 of the aperture 84 has a first set of threads 88.

The mechanical fastener 76, as shown in FIG. 2, preferably has a second set of complementary threads 90 on at least an end portion 92. The fastener 76 is designed to fit within the locking mechanism fastener channel 40 and have sufficient length so that the second set of threads 90 can engage with the first set of threads 88 when the block 74 is located in the window 38. Those skilled in the art will appreciate that when the first set of threads 88 are advanced into threads in the channel 40, if any, and the second set of threads 70 of the fastener 76 will move the block 74 toward a radially outward portion 94 of the window 38, and vice versa. In the preferred embodiment, the fastener 76 will move the block 74 toward the outer peripheral edge 42.

Figure 10:
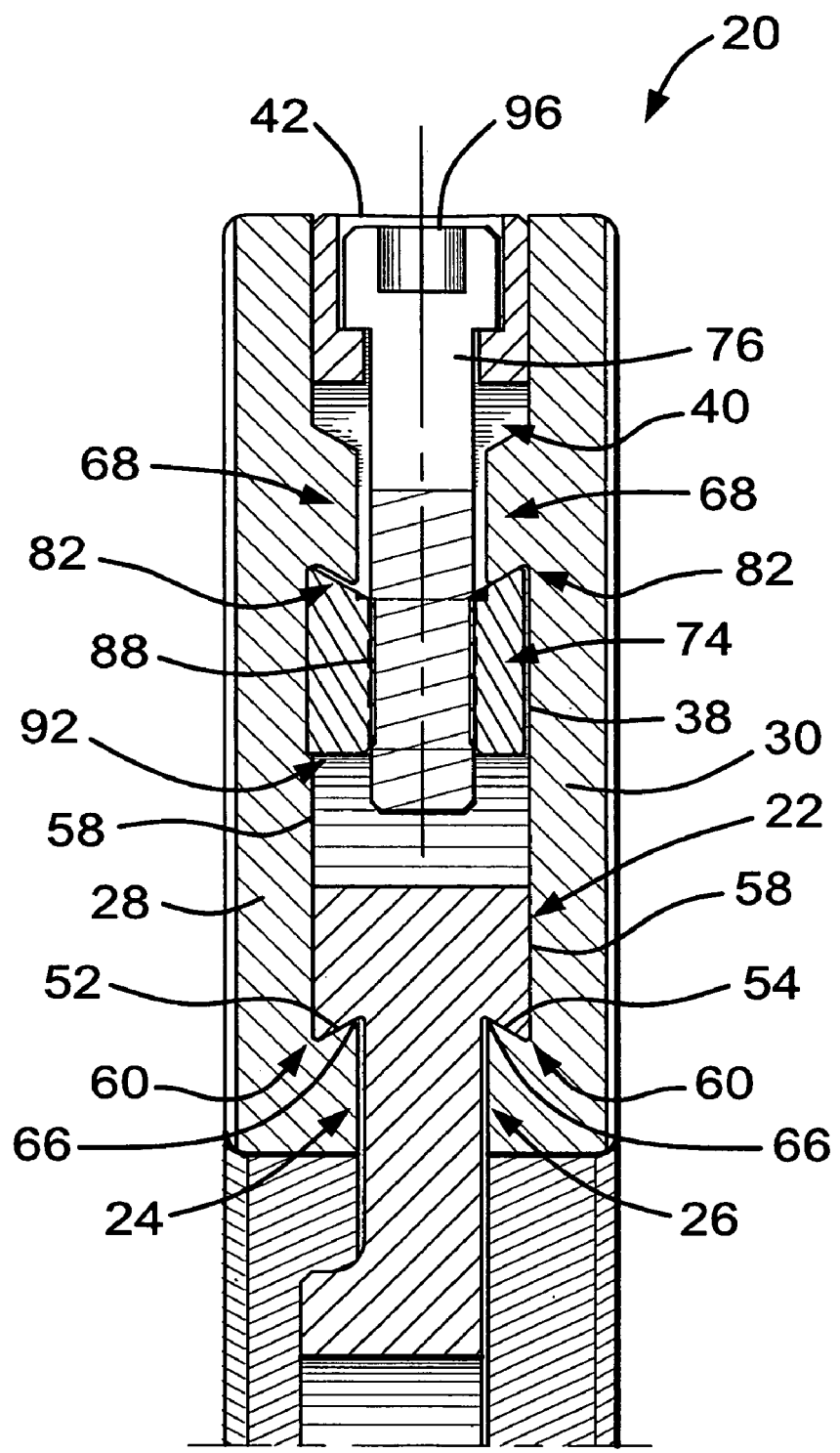
FIG. 10 is a partial, schematic side view of the present invention.

One preferred method of assembling the disc brake rotor assembly 20 of the present invention is to locate a block 74 within each of the locking mechanism windows 38. Preferably, the upstanding portions 82 of each of the blocks 74 are pointed radially outward from the center of the central carrier 22, as shown for one block 74 in FIG. 10.

Two or more separate wear surfaces 28, 30, each as described above, are located on each side 24, 26 of the central carrier 22, as best seen in FIG. 1. Specifically, each upstanding fitting 56 of each wear surface 28, 30 is located within each surface channel 44 of the central carrier 22, as shown in FIG. 2.

The lip 66 of the arced groove 60 on the wear surface 28 is engaged with the first lip 52 on the first side 24 of the central carrier 22. Wear surface 28 is positioned so that the tab 68 on one end of the wear surface 28 is aligned with the upstanding portion 82 of the block 74 in one of the windows 38. The wear surface 28 is also positioned so that the tab 68 on the other end of the wear surface 28 is aligned with the upstanding portion 82 of the block 74 in the next adjacent window 38. Those skilled in the art will appreciate that locating the wear surfaces 28 in this manner locates a tab 68 of one wear surface 28 on one half of an upstanding portion 82 of a block 74 and another tab 68 from an adjacent wear surface 28 on the other half of the upstanding portion 82 of the same block 74. In light of the above-described alignment of the wear surface 28 with the carrier 22, it will be readily appreciated that the first lip 52 need not extend about the full circumference of the carrier 22.

In the preferred embodiment, a set of three wear surfaces 30 is located on the second side 26 of the central carrier 22. Each upstanding fitting 56 of each wear surface 30 is located within each surface channel 44 of the central carrier 22 on the second side 26, as similarly shown in FIG. 2. Referring back to FIG. 10, the lip 66 of the arced groove 60 on each wear surface 30 is engaged with the second lip 54 on the second side 26 of the central carrier 22.

Each wear surface 30 is positioned so that the tab 68 on one end of the wear surface 30 is aligned with the upstanding portion 82 of the block 74 in one of the windows 38. The wear surface 30 is also positioned so that the tab 68 on the other end of the wear surface 30 is aligned with the upstanding portion 82 of the block 74 in the next adjacent window 38. Those skilled in the art will appreciate that locating the wear surfaces 30 in this manner locates a tab 68 of one wear surface 30 on one half of an upstanding portion 82 of a block 74 and another tab 68 from an adjacent wear surface 30 on the other half of the upstanding portion 82 of the same block 74. In light of the above-described alignment of the wear surface 30 with the carrier 22, it will be readily appreciated that the second lip 54 need not extend about the full circumference of the carrier 22.

Those skilled in the art will appreciate that the tabs 68 and the window 38 and block 74 combination can be designed so that a block 74 fully engages the entire lip of a tab 72, rather than just half of the tab 72. It is also well within the scope of the present invention to utilize additional locking mechanisms 32, other than the three described in the preferred embodiment.

The mechanical fastener 76 is located in each channel 40. The threaded end 92 of the mechanical fastener 76 is engaged with the aperture 84 in the block 74. A tool (not shown) is fitted into the head 96 of the mechanical fastener 76 to advance the fastener 76 into the block 74. As the fastener 76 is advanced into the threads in the channel 40, if applicable, and into the threads 88 in the block 74, it draws the block 74 radially outwardly in the window 38. The upstanding portions 82 of the block 74, securely engage with the tabs 68 of at least two wear surfaces 28, 30 to lock the wear surfaces 28, 30 in place. Accessing the opening for the channel 40 in the peripheral edge 42 facilitates securing or removing the wear surfaces 28, 30 without having to remove the assembly 20 from the hub, or any other wheel end equipment.

The first lip 52 of the first side 24 of the carrier 22 engages with the arced groove 60 on the inside surface 58 of each wear surface 28 on the first side 24 to prevent movement of the wear surface 28 in an outward direction. Similarly, the second lip 54 on the second side 26 of the carrier 22 engages with the arced groove 60 on the inside surface 58 of each wear surface 30 on the second side 26 to prevent movement of the wear surface 30 in an outward direction.

One or more of the fasteners 32 may be backed out from each block 74 to selectively release each wear surface 28, 30 for repair, replacement or inspection. Each wear surface 28, 30 preferably extends no more than 180 degrees around either side 24, 26 of the carrier 22 so that it can be removed without removing the carrier 22 from the hub. Each of the wear surfaces 28, 30 on both sides 24, 26 of the carrier 22 can be radially removed and replaced without removing the carrier 22 from the hub or removing any brake mechanism, or actuators, such as a brake caliper, as known to those skilled in the art.

A safety wire (not shown) may be used with the fastener 32 to prevent, or reduce, the likelihood that the fastener 32 will dislodge from the block 74 and channel 78.

Figure 11:
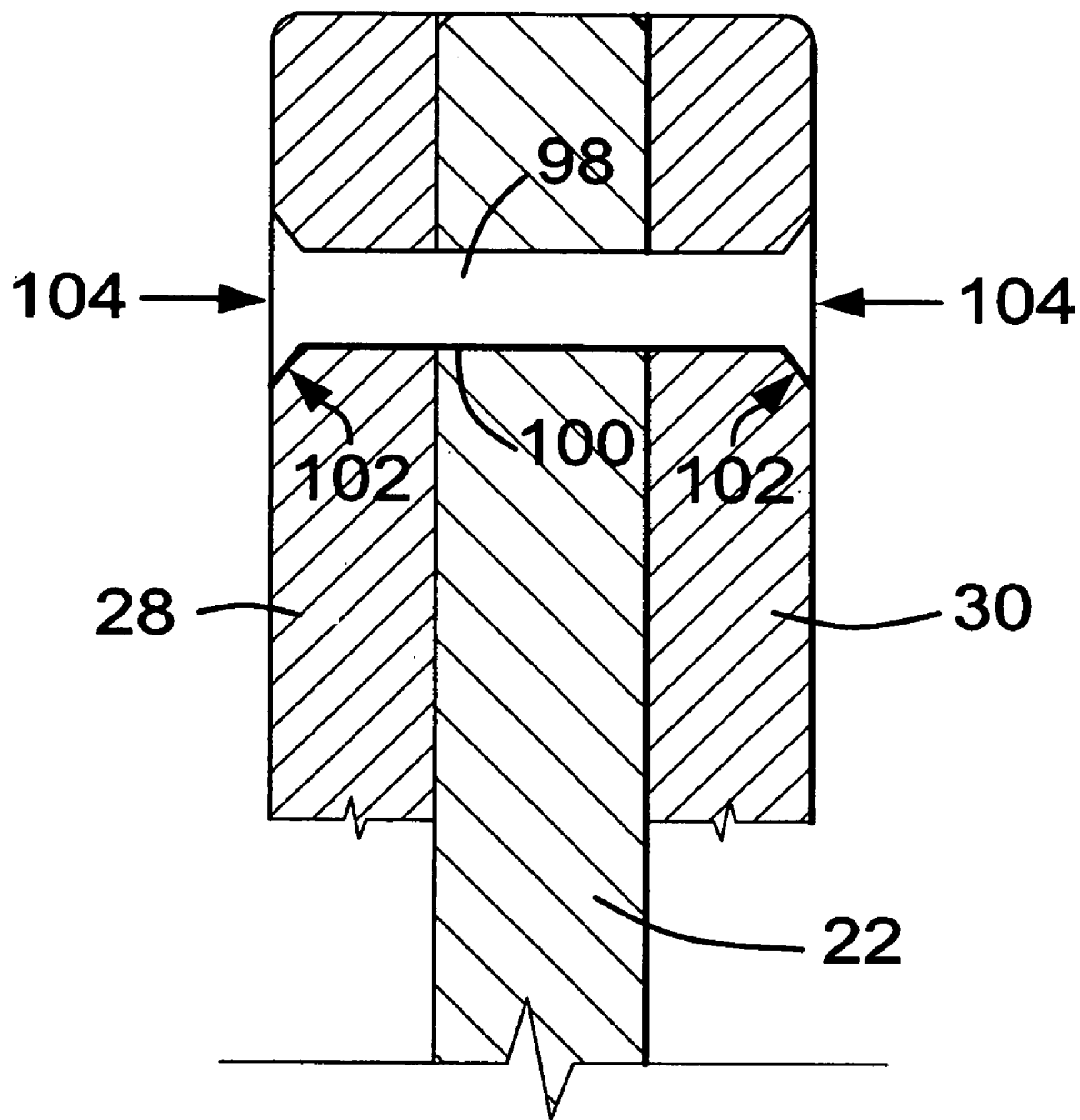
FIG. 11 is a partial, schematic side view of an alternative embodiment of the present invention.

In addition to, or separate from the invention described above and depicted in the figures, a plurality of dowels 98 may be located through wear surface 28, through the carrier 22 and through wear surface 30 to secure the wear surfaces 28, 30 to the carrier 22, as shown in FIG. 11. The carrier 22 depicted in FIG. 11 may or may not be fitted with the locking mechanism windows 38 and locking mechanism 32.

Preferably, each dowel 98 is located in a tight tolerance aperture 100 in the carrier 22. The apertures 100 are spaced about the carrier 22. The dowels 98 located in the apertures 100 can be a roll pin type, two dowel pieces threaded together and/or one piece coined on one end to retain the face. Regardless of the type of dowel 98 used, the dowels 98 preferably have flared ends 102 to contact an outside portion 104 of the wear surfaces 28, 30. Preferably, the flared ends 102 of the dowels 98 are flush with the outside portion 104. The dowels 98 and the flared ends 102 of the dowels 98 reduce, or prevent, axial and radial movement of the wear surfaces 28, 30.

The dowels 98 can be removed by selectively knocking them out of each aperture 100, drilling them out of each aperture 100 and/or unscrewing them from each aperture 100. The dowels 98 also allow for the wear surfaces 28, 30 to be removed and replaced while the carrier 22 remains mounted on the hub. Additionally, the dowels 98 allow for the wear surfaces 28, 30 to be removed and replaced with a minimum, or no disturbance, to the wheel end components such as the bearings, seals, hubs, brake caliper.

Figure 12:
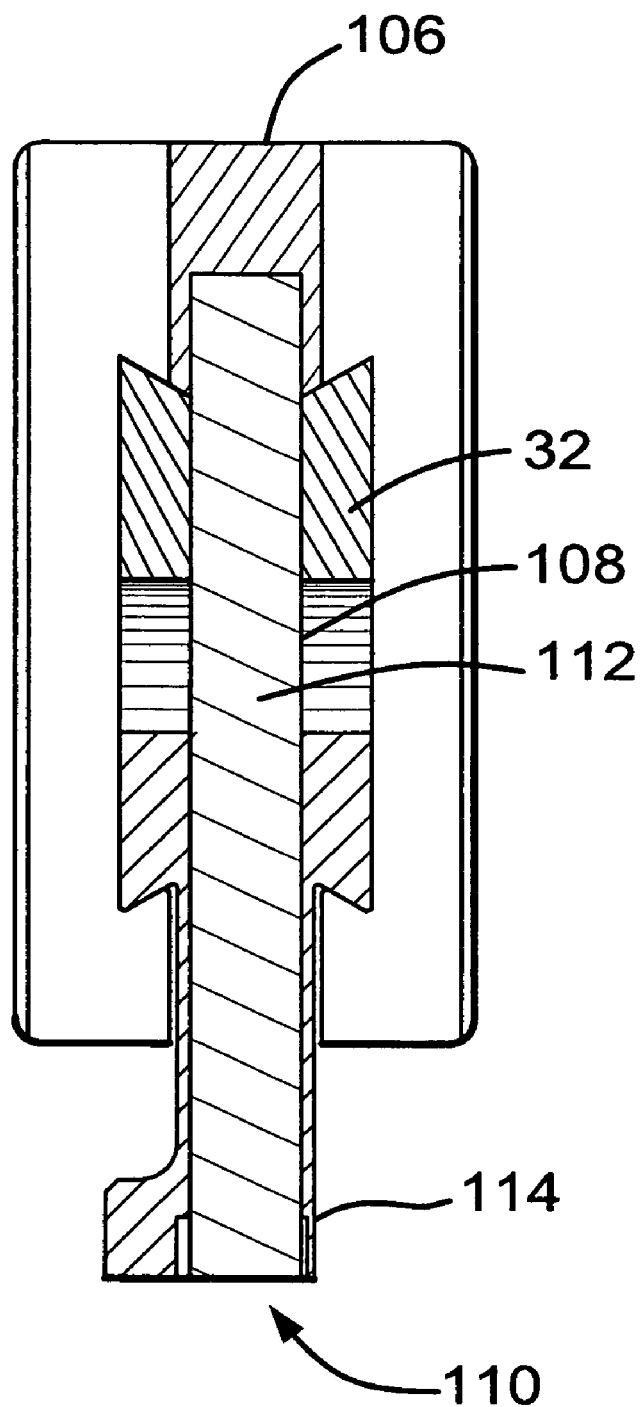
FIG. 12 is a partial, schematic side view of yet another alternative embodiment of the present invention.

Yet another embodiment of the present invention is depicted in FIG. 12. In this embodiment, a carrier 106 that is identical to the carrier 22 described above is used except carrier 106 has a locking mechanism fastener channel 108 that extends from an inner peripheral edge 110 of the carrier 22 to the locking mechanism 32. A fastener 112 is located within the channel 108 to engage with the block 74, as described above. A lock nut 114 may be located within the carrier 106 to prevent the fastener 112 from becoming loose from the channel 108. Wear surfaces 28, 30 are held in place by the locking mechanism 32 as described above.

The above-described design, including the alternative embodiments, restrains the wear surfaces 28, 30 from moving in either the radial or lateral direction on the carrier 22. Such radial or lateral movements are restrained regardless whether they are generated by forces intrinsic to a brake duty cycle, as known to those skilled in the art, or otherwise. By way of example only, the movements may be the result of torque and/or rotational forces on the assembly 20 and/or the alternate heating and cooling of the disc brake rotor assembly 20 during braking of a vehicle. The movements are restrained regardless whether the wear surfaces 28, 30 are constructed of the same material and/or have the same thermal properties, as the carrier 22, or not.

Wear surface 28 is selectively restrained from radial and/or lateral movement by virtue of the engagement of the first lip 52 on the first side 24 of the carrier 22 with lip 66, the engagement of each tab 68 with the upstanding portion of each block 74, and/or the engagement of each upstanding fitting 56 with each surface channel 44. Similarly, wear surface 30 is selectively restrained from radial and/or lateral movement by virtue of the engagement of the second lip 54 on the second side 26 of the carrier 22 with lip 66, the engagement of the each tab 68 with the upstanding portion of each block 74, and/or the engagement of each upstanding fitting with each surface channel 44.

In accordance with the provisions of the patent statutes, the present invention has been described in what is considered to represent its preferred embodiments. However, it should be noted that the invention can be practiced otherwise than as specifically illustrated and described without departing from its spirit or scope.

What is claimed is:

1. A disc brake rotor assembly, comprising:
   a central carrier having a first side, a second side, an outer peripheral edge, an inner peripheral edge and at least two locking mechanism windows spaced from and confined by said inner peripheral edge and said outer peripheral edge and extending from said first side to said second side;
   at least two wear surfaces located on said first side and at least two wear surfaces located on said second side;
   at least one locking mechanism disposed within said central carrier for selectively and directly securing and releasing an inside surface of said wear surfaces on said first side and an inside surface of said wear surfaces on said second side, said at least one locking mechanism comprising a block and a fastener selectively engagable with said block, said fastener extending inwardly from said outer peripheral edge of said carrier to said block; and
   at least two locking mechanism fastener channels, connect said outer peripheral edge of said central carrier with said at least two locking mechanism windows respectively.

2. The disc brake rotor assembly of claim 1, wherein at least two surface channels are located on said first side of said central carrier and at least two surface channels are located on said second side of said central carrier, said surface channels on said first side being laterally aligned with said surface channels on said second side of said central carrier.

3. The disc brake rotor assembly of claim 2, wherein a circumferential groove is located on said first side of said central carrier, said groove being bounded by an inner wall and an outer wall and wherein said outer wall has at least a partial circumferential first lip.

4. The disc brake rotor assembly of claim 3, wherein said second side of said central carrier has at least a partial circumferential second lip.

5. The disc brake rotor assembly of claim 4, wherein each of said wear surfaces has at least one upstanding fining on each of said inside surfaces, respectively, said at least one upstanding fitting having a complementary shape to one of said surface channels.

6. The disc brake rotor assembly of claim 5, wherein an arced groove is located on said inside surface of each of said wear surfaces and wherein said arced groove is bounded by an inner wall having a lip.

7. The disc brake rotor assembly of claim 6, wherein at least two tabs are mounted on said inside surface of each of said wear surfaces and wherein an inside edge of each of said tabs has a lip.

8. The disc brake rotor assembly of claim 7, wherein said fastener is located in one of said at least two locking mechanism fastener channels to selectively secure said block with said central carrier.

9. The disc brake rotor assembly of claim 8, wherein said block has a channel along an upper portion, said channel along said upper portion of said block being bounded by at least two upstanding portions and said upstanding portions of said block designed to selectively engage with said lips of said tabs.

10. The disc brake rotor assembly of claim 9, wherein said lip of said arced groove on one of said wear surfaces selectively engages with said first lip on said first side of said central carrier.

11. The disc brake rotor assembly of claim 10, wherein said lip of said arced groove on another of said wear surfaces selectively engages with said at least partial circumferential second lip on said second side of said central carrier.

12. The disc brake rotor assembly of claim 1, wherein said central carrier is constructed of a first material and said at least two wear surfaces on both said first side and said second side are constructed of a second material wherein said second material has greater thermal properties and wear properties than said first material.

13. The disc brake rotor assembly of claim 11, wherein radial and/or lateral motion of said at least two wear surfaces on both said first side and said second side is selectively restrained by engagement of said at least one locking mechanism with said wear surfaces, by engagement with said at least one upstanding fitting with at least one of said surface channels, and by engagement of said first lip and said at least partial circumferential second lip with said wear surfaces.

* * * * *